United States Patent
Zhang et al.

(10) Patent No.: US 10,333,676 B2
(45) Date of Patent: Jun. 25, 2019

(54) EPDCCH SEARCH SPACE DETERMINATION

(71) Applicant: Nokia Technologies Oy, Espoo (FI)

(72) Inventors: Yuantao Zhang, Beijing (CN); Chunhai Yao, Beijing (CN); Lars Lindh, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 15/553,277

(22) PCT Filed: Apr. 10, 2015

(86) PCT No.: PCT/CN2015/076364
§ 371 (c)(1),
(2) Date: Aug. 24, 2017

(87) PCT Pub. No.: WO2016/161651
PCT Pub. Date: Oct. 13, 2016

(65) Prior Publication Data
US 2018/0048448 A1 Feb. 15, 2018

(51) Int. Cl.
*H04L 5/00* (2006.01)
*H04W 16/32* (2009.01)
(Continued)

(52) U.S. Cl.
CPC ............ *H04L 5/0053* (2013.01); *H04L 5/001* (2013.01); *H04L 5/0092* (2013.01);
(Continued)

(58) Field of Classification Search
CPC ..... H04L 5/001; H04L 5/0053; H04L 5/0092; H04L 5/0098; H04W 72/042; H04W 16/32; H04W 24/10; H04W 88/02
See application file for complete search history.

(56) References Cited

U.S. PATENT DOCUMENTS 8,606,286 B2    12/2013  Vrzic et al.
2013/0194956 A1  8/2013  Sartori et al.
(Continued)

FOREIGN PATENT DOCUMENTS

CN    102624489 A     8/2012
CN    104349458 A     2/2015
WO    2013/107256 A1  7/2013

OTHER PUBLICATIONS

"Discussions on Downlink Control Channel for Rel-13 MTC UE", 3GPP TSG-RAN Working Group 1 meeting #80, R1-150674, Agenda: 7.2.1.2.1, MediaTek Inc, Feb. 9-13, 2015, 3 pages.
(Continued)

*Primary Examiner* — Mewale A Ambaye
(74) *Attorney, Agent, or Firm* — Harrington & Smith

(57) ABSTRACT

Embodiments of the present invention generally relate to enhanced physical downlink control channel (EPDCCH) search space determination. In one embodiment, a base station may identify an index of the current EPDCCH occasion period, each EPDCCH occasion period including a number of subframes, and the subframes being divided to a number of search units. A distribution of EPDCCH candidates corresponding to at least one EPDCCH aggregation level in the EPDCCH occasion period may be determined based on the index of the EPDCCH occasion period and the number of search units in the EPDCCH occasion period. The base station may then select, from the distribution of the EPDCCH candidates, an EPDCCH candidate for transmitting downlink control information (DCI) to a UE.

17 Claims, 7 Drawing Sheets

(51) Int. Cl.
*H04W 88/02* (2009.01)
*H04W 24/10* (2009.01)
*H04W 72/04* (2009.01)

(52) U.S. Cl.
CPC ........... *H04L 5/0098* (2013.01); *H04W 16/32* (2013.01); *H04W 24/10* (2013.01); *H04W 88/02* (2013.01); *H04W 72/042* (2013.01)

(56) References Cited

U.S. PATENT DOCUMENTS

| | | | |
|---|---|---|---|
| 2013/0250880 A1* | 9/2013 | Liao | H04W 72/042 370/329 |
| 2014/0092821 A1 | 4/2014 | Zhu et al. | |
| 2014/0098761 A1 | 4/2014 | Lee et al. | |
| 2014/0146769 A1 | 5/2014 | Ahn et al. | |
| 2014/0247816 A1 | 9/2014 | Kim et al. | |
| 2016/0330633 A1* | 11/2016 | You | H04L 5/0053 |
| 2017/0163396 A1* | 6/2017 | Blankenship | H04L 1/0031 |

OTHER PUBLICATIONS

International Search Report and Written Opinion received for corresponding Patent Cooperation Treaty Application No. PCT/CN2015/076364, dated Jan. 7, 2016, 11 pages.

Extended European Search Report received for corresponding European Patent Application No. 15888207.6, dated Oct. 10, 2018, 7 pages.

"Further details of Physical Downlink Control Channel for MTC", 3GPP TSG-RAN Working Group 1 meeting #80, R1-150284, Agenda: 7.2.1.2.1, NEC, Feb. 9-13, 2015, pp. 1-5.

"Coverage Enhancement for (E)PDCCH", 3GPP TSG-RAN Working Group 1 meeting #76, R1-140154, Agenda: T.2.2.2.3, Alcatel-Lucent, Feb. 10-14, 2014, 5 pages.

* cited by examiner

EPDCCH SEARCH SPACE DETERMINATION

RELATED APPLICATION

This application was originally filed as PCT Application No. PCT/CN2015/076364 filed Apr. 10, 2015.

BACKGROUND

Major efforts have been put in recent years on the development of Third Generation Partnership Project (3GPP) Long Term Evolution (LTE) in order to achieve throughput and coverage improvement. In 3GPP LTE systems, some subframes can be allocated for enhanced physical downlink control channel (EPDCCH) for transmitting downlink control information (DCI). According to current 3GPP LTE specifications, a DCI (herein also called as EPDCCH message) may be transmitted by an EPDCCH candidate including 1, 2, 4, or 8 enhanced control channel elements (ECCEs). Depending on the number of ECCEs included in an EPDCCH candidate, there are multiple aggregation levels for the transmission of the EPDCCH message, such as EPDCCH aggregation level 1, 2, 4, or 8. An EPDCCH search space defines the ECCEs included in a specific EPDCCH candidate for a specific aggregation level.

A Mobile station such as a user equipment (UE) in the systems does not know in advance the EPDCCH candidate that carries an EPDCCH message intended for it. In general, the mobile station may attempt to blindly decode each possible EPDCCH candidate for each EPDCCH aggregation level in each subframe. More specifically, the mobile station firstly determines the ECCEs included in each EPDCCH candidate for each aggregation level according to the search space definition, and then performs blind decoding of the EPDCCH candidates to obtain any EPDCCH message intended for it.

In existing 3GPP LTE systems, the search space for a certain aggregation level is defined using a hashing function. For an EPDCCH PRB (physical resource block) set p (there can be two EPDCCH PRB sets for a certain UE), the ECCEs in the EPDCCH search space corresponding to an EPDCCH candidate m of an aggregation level L are given by:

$$L\left\{\left(Y_{p,k} + \left\lfloor \frac{m \cdot N_{ECCE,p,k}}{L \cdot M_p^{(L)}} \right\rfloor \right) \bmod \lfloor N_{ECCE,p,k}/L \rfloor \right\} + i \quad (1)$$

where $Y_{p,k} = (A_p \cdot Y_{p,k-1}) \bmod D$;

$i = 0, \ldots, L-1$;

k represents the index of the current subframe, which may be in a range from 0 to 9 as ten subframes, subframes 0 to 9, are indexed in a frame;

$N_{ECCE,p,k}$ represents the number of ECCEs included in the EPDCCH PRB set p of the subframe k;

$m = 0, 1, \ldots M_p^{(L)} - 1$;

$M_p^{(L)}$ represents the number of EPDCCH candidates for the aggregation level L in the EPDCCH PRB set p;

$Y_{p,k}$ represents a random number used for the randomization of the search space, $Y_{p,-1} = n_{RNTI} \neq 0$, $A_0 = 39827$, $A_1 = 39829$, $D = 65537$; and $n_{RNTI}$ represents the cell radio network temporary identifier (C-RNTI) of the UE.

With the starting positions of all EPDCCH candidates and the aggregation levels of the EPDCCH candidates, a base station such as evolved Node B (eNB) may select EPDCCH candidates for transmitting DCI for UE required resource allocation based on some scheduling strategy. One EPDCCH candidate may be selected for the DCI intended for a respective UE.

The UE may also determine the starting positions of all EPDCCH candidates for all aggregation levels in each subframe. By knowing the position of ECCEs included in each of the EPDCCH candidate, the UE may detect in each EPDCCH candidate via blind decoding to see whether there is DCI intended for it.

However, blind decoding of all the possible EPDCCH candidates in each subframe may cost a lot of power consumption. Existing EPDCCH search space determination is not suitable for the use cases where UE requires power consumption reduction. For example, UE for machine type communication (MTC UE) generally requires low power consumption to target ultra-long battery life and is thus desired to cost as low as possible during DCI detection. Moreover, since some UEs, such as MTC UEs deployed in challenging locations (also referred to as MTC UEs in coverage enhanced mode) may experience poor channel quality, eNB may transmit EPDCCH to such UEs using repetition. It is especially desirable that the power consumption for these UEs during EPDCCH detection could be as low as possible. Besides, LTE Rel.13 MTC UE only needs to support 1.4 MHz (i.e., only 6 PRB pairs) radio frequency (RF) bandwidth in downlink and uplink within any system bandwidth. A UE can be assigned with one or multiple UE-specific regions after initial access, depending on whether frequency hopping would be used for EPDCCH transmission.

SUMMARY

Various embodiments of the present invention aim at addressing at least part of the above problems and disadvantages. Other features and advantages of embodiments of the present invention will also be understood from the following description of specific embodiments when read in conjunction with the accompanying drawings, which illustrate, by way of example, the principles of embodiments of the present invention.

Various aspects of embodiments of the present invention are set forth in the appended claims and summarized in this section. It shall be noted that the protection scope of the present invention is only limited by the appended claims.

According to a first aspect, embodiments of the present invention provide a method implemented at least in part by a base station. The method comprises identifying an index of the current EPDCCH occasion period, each EPDCCH occasion period including a number of subframes, and the subframes being divided to a number of search units. The method also comprises determining, based on the index of the EPDCCH occasion period and the number of search units in the EPDCCH occasion period, a distribution of EPDCCH candidates corresponding to at least one EPDCCH aggregation level in the EPDCCH occasion period, each EPDCCH aggregation level corresponding to at least one EPDCCH candidate, and each EPDCCH candidate including at least one search unit. The method further comprises selecting, from the distribution of the EPDCCH candidates, an EPDCCH candidate for transmitting DCI to a UE.

According to a second aspect, embodiments of the present invention provide a method implemented at least in part by a UE. The method comprises identifying an index of the current EPDCCH occasion period, each EPDCCH occasion period including a number of subframes, and the subframes being divided to a number of search units. The method also comprises determining, based on the index of the EPDCCH occasion period and the number of search units in the EPDCCH occasion period, a distribution of EPDCCH candidates corresponding to at least one EPDCCH aggregation level in the EPDCCH occasion period, each EPDCCH aggregation level corresponding to at least one EPDCCH candidate, and each EPDCCH candidate including at least one search unit. The method further comprises detecting, based on the distribution of the EPDCCH candidates, DCI transmitted from a base station.

According to a third aspect, embodiments of the present invention provide a base station. The base station comprises an index identification unit configured to identify an index of the current EPDCCH occasion period, each EPDCCH occasion period including a number of subframes, and the subframes being divided to a number of search units. The base station also comprises a distribution determination unit configured to determine, based on the index of the EPDCCH occasion period and the number of search units in the EPDCCH occasion period, a distribution of EPDCCH candidates corresponding to at least one EPDCCH aggregation level in the EPDCCH occasion period, each EPDCCH aggregation level corresponding to at least one EPDCCH candidate, and each EPDCCH candidate including at least one search unit. The base station further comprises a candidate selection unit configured to select, from the distribution of the EPDCCH candidates, an EPDCCH candidate for transmitting DCI to a UE.

According to a fourth aspect, embodiments of the present invention provide a UE. The UE comprises an index identification unit configured to identify an index of the current EPDCCH occasion period, the EPDCCH occasion period including a number of subframes, and the subframes being divided to a number of search units. The UE also comprises a distribution determination unit configured to determine, based on the index of the EPDCCH occasion period and the number of search units in the EPDCCH occasion period, a distribution of EPDCCH candidates corresponding to at least one EPDCCH aggregation level in the EPDCCH occasion period, each EPDCCH aggregation level corresponding to at least one EPDCCH candidate, and each EPDCCH candidate including at least one search unit. The UE further comprises a detection unit configured to detect, based on the distribution of the EPDCCH candidates, DCI transmitted from a base station.

According to a fifth aspect, embodiments of the present invention provide an apparatus. The apparatus may be a base station or may be embodied in the base station. The apparatus comprises at least one processor and at least one memory including computer program code. The at least one memory and the computer program code are configured to, with the at least one processor, cause the apparatus at least to perform the method as set forth in the first aspect.

According to a sixth aspect, embodiments of the present invention provide an apparatus. The apparatus may be a UE or may be embodied in the UE. The apparatus comprises at least one processor and at least one memory including computer program code. The at least one memory and the computer program code are configured to, with the at least one processor, cause the apparatus at least to perform the method as set forth in the second aspect.

According to a seventh aspect, embodiments of the present invention provide a computer-readable storage medium having computer program codes stored thereon. The computer program codes are configured to, when executed, cause an apparatus to perform the method as set forth in the first aspect.

According to an eighth aspect, embodiments of the present invention provide a computer-readable storage medium having computer program codes stored thereon. The computer program codes are configured to, when executed, cause an apparatus to perform the method as set forth in the second aspect.

According to a ninth aspect, embodiments of the present invention provide a method implemented at least in part by a base station. The method comprises selecting, in a first periodicity, an EPDCCH candidate from EPDCCH candidates corresponding to a first set of EPDCCH aggregation level for transmitting first DCI to a UE, the first set including at least one EPDCCH aggregation level and each EPDCCH aggregation level corresponding to at least one EPDCCH candidate. The method also comprises selecting, in a second periodicity, an EPDCCH candidate from EPDCCH candidates corresponding to a second set of EPDCCH aggregation level for transmitting the second DCI to the UE, the second set including at least one EPDCCH aggregation level and each EPDCCH aggregation level corresponding to at least one EPDCCH candidate. The first periodicity is longer than the second periodicity. At least one of the EPDCCH aggregation level included in the first set is higher than the EPDCCH aggregation level included in the second set.

According to a tenth aspect, embodiments of the present invention provide a method implemented at least in part by a UE. The method comprises detecting, in a first periodicity, first DCI transmitted from a base station in each of EPDCCH candidates corresponding to a first set of EPDCCH aggregation level, the first set including at least one EPDCCH aggregation level and each EPDCCH aggregation level corresponding to at least one EPDCCH candidate. The method also comprises detecting, in a second periodicity, second DCI transmitted from the base station in each of EPDCCH candidates corresponding to a second set of EPDCCH aggregation level, the second set including at least one EPDCCH aggregation level and each EPDCCH aggregation level corresponding to at least one EPDCCH candidate. The first periodicity is longer than the second periodicity. At least one of the EPDCCH aggregation level included in the first set is higher than the EPDCCH aggregation level included in the second set.

According to an eleventh aspect, embodiments of the present invention provide a base station. The base station comprises a first selection unit configured to select, in a first periodicity, an EPDCCH candidate from EPDCCH candidates corresponding to a first set of EPDCCH aggregation level for transmitting first DCI to a UE, the first set including at least one EPDCCH aggregation level and each EPDCCH aggregation level corresponding to at least one EPDCCH candidate. The base station also comprises a second selection unit configured to select, in a second periodicity, an EPDCCH candidate from EPDCCH candidates corresponding to a second set of EPDCCH aggregation level for transmitting the second DCI to the UE, the second set including at least one EPDCCH aggregation level and each EPDCCH aggregation level corresponding to at least one EPDCCH candidate. The first periodicity is longer than the second periodicity. At least one of the EPDCCH aggregation level included in the first set is higher than the EPDCCH aggregation level included in the second set.

According to a twelfth aspect, embodiments of the present invention provide a UE. The UE comprises a first detection unit configured to detect, in a first periodicity, first DCI transmitted from a base station in each of EPDCCH candidates corresponding to a first set of EPDCCH aggregation level, the first set including at least one EPDCCH aggregation level and each EPDCCH aggregation level corresponding to at least one EPDCCH candidate. The UE also comprises a second detection unit configured to detect, in a second periodicity, second DCI transmitted from the base station in each of EPDCCH candidates corresponding to a second set of EPDCCH aggregation level, the second set including at least one EPDCCH aggregation level and each EPDCCH aggregation level corresponding to at least one EPDCCH candidate. The first periodicity is longer than the second periodicity. At least one of the EPDCCH aggregation level included in the first set is higher than the EPDCCH aggregation level included in the second set.

According to a thirteen aspect, embodiments of the present invention provide an apparatus. The apparatus may be a base station or may be embodied in the base station. The apparatus comprises at least one processor and at least one memory including computer program code. The at least one memory and the computer program code are configured to, with the at least one processor, cause the apparatus at least to perform the method as set forth in the ninth aspect.

According to a fourteen aspect, embodiments of the present invention provide an apparatus. The apparatus may be a UE or may be embodied in the UE. The apparatus comprises at least one processor and at least one memory including computer program code. The at least one memory and the computer program code are configured to, with the at least one processor, cause the apparatus at least to perform the method as set forth in the tenth aspect.

According to a fifteen aspect, embodiments of the present invention provide a computer-readable storage medium having computer program codes stored thereon. The computer program codes are configured to, when executed, cause an apparatus to perform the method as set forth in the ninth aspect.

According to a sixteen aspect, embodiments of the present invention provide a computer-readable storage medium having computer program codes stored thereon. The computer program codes are configured to, when executed, cause an apparatus to perform the method as set forth in the tenth aspect.

DESCRIPTION OF THE DRAWINGS

The above and other aspects, features, and benefits of various embodiments of the present invention will become more fully apparent, by way of example, from the following detailed description and the accompanying drawings, in which like reference numerals refer to the same or similar elements.

DETAILED DESCRIPTION

The present invention will now be discussed with reference to several example embodiments. It should be understood these embodiments are discussed only for the purpose of enabling those skilled persons in the art to better understand and thus implement the present invention, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT). Moreover, the UE may include MTC UE enabling machine type communications, such as an intelligent electric meter. MTC UE may support 1.4 MHz frequency bandwidth for uplink and downlink communication.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one further embodiment." Other definitions, explicit and implicit, may be included below.

Figure 1:
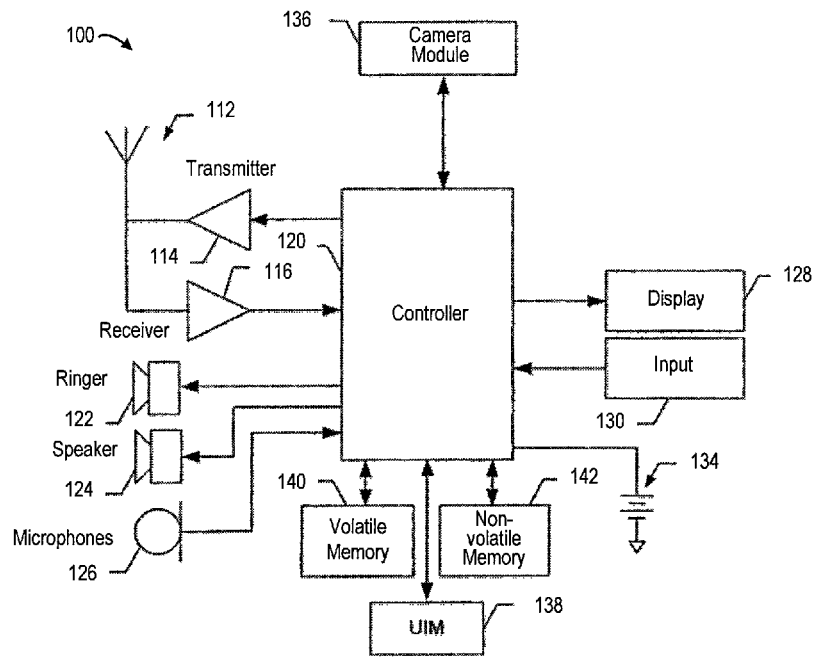
FIG. 1 illustrates a block diagram of user equipment in accordance with one embodiment of the present invention.

FIG. 1 illustrates a block diagram of UE 100 in accordance with one embodiment of the present invention. The UE 100 may be a mobile device with a wireless communication capability. However, it is to be understood that any other types of user devices may also easily adopt embodiments of the present invention, such as MTC UE, a mobile computer, a laptop, a tablet computer, a GPS device, and other types of voice and textual communication system. A fixed-type device may likewise easily use embodiments of the present invention.

As shown, the UE 100 comprises one or more antennas 112 operable to communicate with the transmitter 114 and the receiver 116. With these devices, the UE 100 may perform cellular communications with one or more BSs. Additionally, the UE 100 may be a MTC UE.

The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

The UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the present invention.

The UE 100 further comprises a memory. For example, the UE 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the UE 100 so as to implement the functions of the UE 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the present invention. In some cases, some devices may be added or reduced as required.

Figure 2:
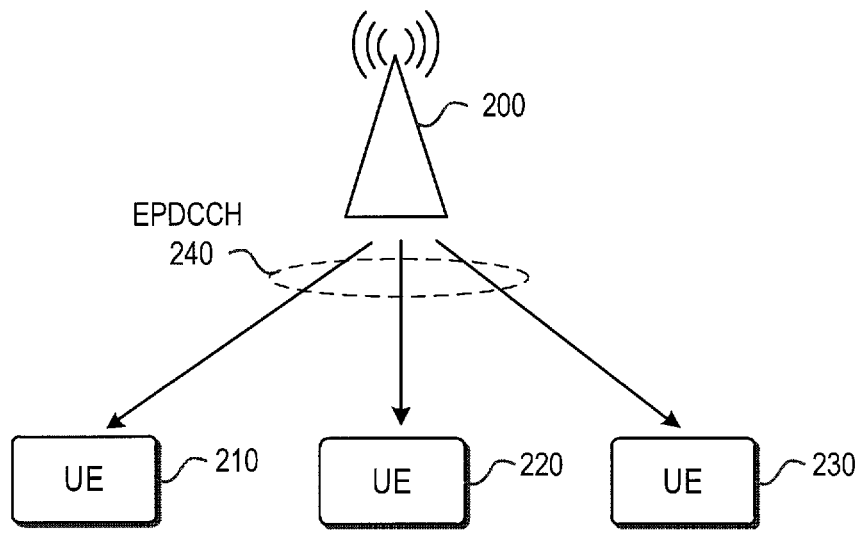
FIG. 2 illustrates a block diagram of an environment in which embodiments of the present invention may be implemented.

FIG. 2 shows an environment in which embodiments of the present invention may be implemented. As shown, one or more UEs may have uplink and downlink communications with a BS 200. In this example, there are three UEs 210, 220, and 230. This is only for the purpose of illustration without suggesting limitations on the number of UEs. There may be any suitable number of UEs in communication with the BS 200. In one embodiment, the UEs 210, 220, and/or 230 may be implemented by the UE 100 as shown in FIG. 1, for example.

The BS 200 may transmit DCI via EPDCCHs 240 to one or more of UEs 210, 220, and 230. DCI may include information on resource allocation for the UE(s) and other control information. DCI intended for one UE may be transmitted in an EPDCCH candidate selected by the BS 200 from EPDCCH candidates corresponding to multiple predefined EPDCCH aggregation levels. Different EPDCCH aggregation levels may have a respective number of EPDCCH candidates.

UE served by the BS 200, e.g., UE 210, 220, or 230 may not know in advance which EPDCCH candidate the BS selected for transmission of the DCI intended for it. As such, UE may perform blind decoding of all EPDCCH candidates corresponding to the predefined EPDCCH aggregation levels.

According to EPDCCH search space configuration in existing 3GPP LTE systems, one possibility is that there are four aggregation levels, referred to as EPDCCH aggregation level 1, 2, 4, or 8. In the EPDCCH aggregation level 1, each EPDCCH candidate uses 1 ECCE for DCI transmission, and in the EPDCCH aggregation level 2, each EPDCCH candidate uses 2 ECCEs for DCI transmission, and so on. In both BS and UE sides, the search space for EPDCCH should be determined so as to transmit the DCI or detect the DCI. The ECCEs includes in each EPDCCH candidate may be determined in the search space.

As discussed in above, the existing EPDCCH search space design may cause blind decoding of all possible EPDCCH candidates in each subframe, which may cost a lot of power consumption. Moreover, as no repetition of DCI transmission is defined in the existing EPDCCH search space configuration, UE experienced poor channel quality may fail to receive the transmitted DCI. Thus the existing EPDCCH search space design is particularly not suitable for coverage enhanced MTC UEs which have poor channel quality. These MTC UE generally requires communication schemes with power consumption reduction to maintain a long battery life.

In view of the above, it is desired to provide an EPDCCH search space design that can address at least part of the above problems and disadvantages and is more suitable for MTC UEs. Embodiments of the present invention propose an EPDCCH search space design where EPDCCH candidates are based on multiple subframes rather than multiple ECCEs in one subframe. That is, the EPDCCH search space extends in time domain.

Figure 3:
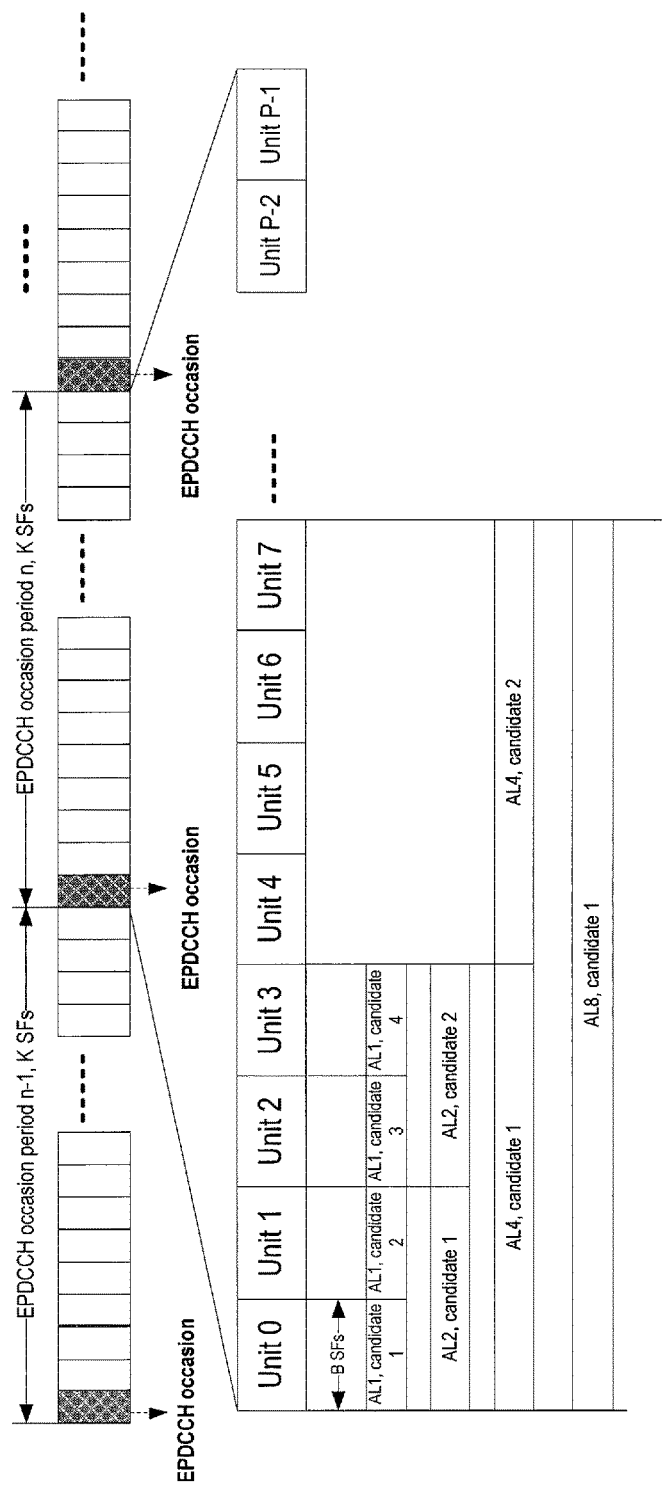
FIG. 3 illustrates a schematic diagram of EPDCCH search space configuration in accordance with one embodiment of the present invention.

FIG. 3 illustrates a schematic diagram of EPDCCH search space configuration in accordance with one embodiment of the present invention. It is noted that EPDCCH search space configuration may be specific for an EPDCCH frequency region. By way of example, for MTC UEs who support 1.4 MHz RF bandwidth, different EPDCCH search space configurations may be defined for respective frequency regions of 1.4 MHz. Those MTC UEs allocated to a certain frequency region may be adapted to the specific EPDCCH search space configuration defined for this region.

According to the EPDCCH search space configuration in FIG. 3, EPDCCH search space is defined in each EPDCCH occasion period containing K subframes, where K is larger than or equal to 2. The value K can be region-specific and signaled to all UEs that are allocated to a specific frequency region. The signaling could be a broadcasting signaling such as a master information block (MIB)/system information block (SIB), or can be a common message signaling such as a random access response (RAR) message. A base station may transmit, based on the EPDCCH search space configuration, DCI to all served in-coverage UEs that are allocated to a specific EPDCCH frequency region who need resource allocation and other control information, for example, the UEs 210, 220, and 230 in each EPDCCH occasion period.

The K subframes may be consecutive in some examples. In some other examples, the K subframes may be discontinuous subframes as long as the base station and UEs are both able to identify the locations of those subframes.

As illustrated in FIG. 3, an EPDCCH occasion period is divided into multiple search units, for example, Units 0 to P−1. Each search unit may include B subframes, where B is larger than or equal to 1. The number of subframes included in a search unit may be determined to fulfill the lowest repetition level for the UEs, which will be described below. In one embodiment, the value B may be signaled to all UEs that allocated to the frequency region corresponding to this EPDCCH search space configuration in the same signaling indicating K, for example, in a broadcasting signal carried MIB/SIB, or in a RAR massage during the initial access. In another embodiment, the UEs may determine the value B autonomously based on the lowest repetition level.

Generally, each search unit contained in an EPDCCH occasion period has the same number of subframes, and thus the number of search units included in the EPDCCH occasion period P may be calculated as ⌈K/B⌉, where ⌈ ⌉ represents the integer upper function.

An EPDCCH aggregation level is defined by using a search unit as the minimum unit. That is to say, an EPDCCH candidate corresponding to the EPDCCH aggregation level may include one or more search units. In this sense, an EPDCCH search space for a specific UE defines the search units included in each EPDCCH candidate for each EPDCCH aggregation level. In each EPDCCH occasion period, one or more EPDCCH aggregation levels may be defined. For example, there may be four aggregation levels defined for a specific UE, aggregation level 1 (referred to as AL1), aggregation level 2 (referred to as AL2), aggregation level 4 (referred to as AL4), and aggregation level 8 (referred to as AL8). In some embodiments, an index of an aggregation level may indicate the number of search units included in each of EPDCCH candidates corresponding to this aggregation level. For example, the index "1" of aggregation level 1 indicates that one search unit is included in an EPDCCH candidate of this aggregation level 1. The higher the aggregation level is, the more the search units included in each of the EPDCCH candidates for the aggregation level is.

One example distribution of EPDCCH candidates is given in Table 1. This distribution is also shown in FIG. 3.

TABLE 1

Search units contained in each EPDCCH candidate for each aggregation level

| Aggregation level | Number of EPDCCH candidate | Search units for each candidate |
| --- | --- | --- |
| 1 | 4 | 0, 1, 2, 3 |
| 2 | 2 | (0, 1), (2, 3) |
| 4 | 2 | (0, 1, 2, 3), (4, 5, 6, 7) |
| 8 | 1 | (0, 1, 2, 3, 4, 5, 6, 7) |

It is noted that the distribution of EPDCCH candidates is shown in FIG. 3 and given in Table 1 for purpose of illustration. The number of aggregation levels may be defined as other values, and the number of the EPDCCH candidates included in each aggregation level may also be defined as other values. The scope of the present invention is not limited in these regards. For example, there may be an additional aggregation level 16 having one EPDCCH candidate in each occasion period, and this EPDCCH candidate uses Units 0 to 15 to carry DCI. It is appreciated that an EPDCCH candidate may include any search units included in the occasion period, and EPDCCH candidates corresponding to the same EPDCCH aggregation level may not be necessarily consecutive as shown in FIG. 3. In some embodiments, there may be an interval of one or more search units between the EPDCCH candidates The principle of the EPDCCH search space configuration is described with reference to FIG. 3. DCI transmission in a base station and DCI detection in user equipment based on this EPDCCH search space configuration will be set forth below.

Figure 4:
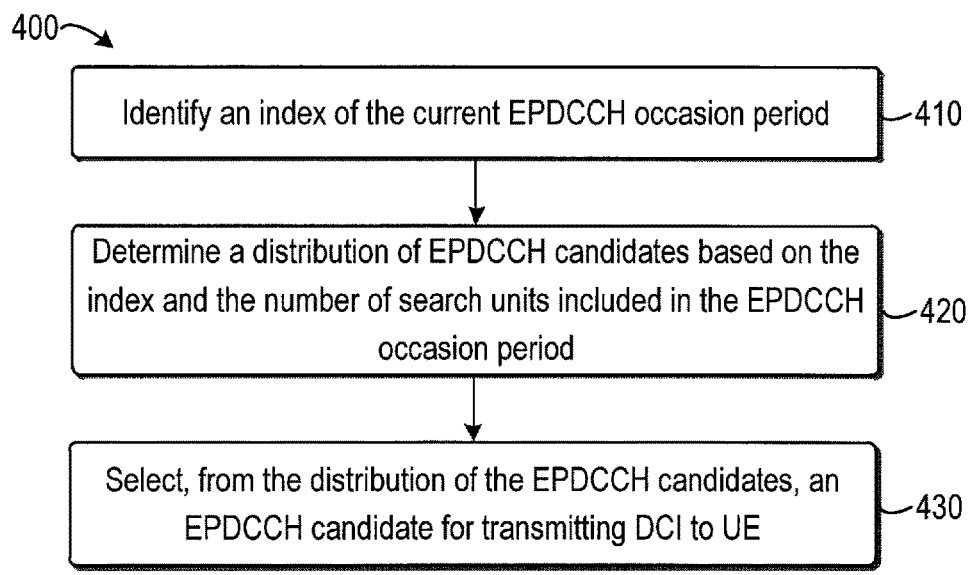
FIG. 4 illustrates a flowchart of a method in a base station for determining an EPDCCH search space for DCI transmission in accordance with one embodiment of the present invention.

FIG. 4 shows a flowchart of a method 400 for determining an EPDCCH search space for DCI transmission in accordance with one embodiment of the present invention. The method 400 may be at least in part implemented by the BS 200, for example.

The method 400 is entered at step 410, where an index of the current EPDCCH occasion period is identified. Since aggregation levels are defined in each EPDCCH occasion period, the EPDCCH search space is also associated with the current EPDCCH occasion period.

The occasion period may be indexed from the time the BS 200 starting operations and the index of the occasion period may be indicated to the UEs by the BS 200 through a broadcast signal carried in MIB/SIB or through a common RAR message during the initial access. In some embodiments, an index of the occasion period during which a UE has initial access to the BS 200 may be signaled to the UE. For example, the UE 210 enters service coverage of the BS 200 and set up initial access in the occasion period n, then the index "n" is transmitted to the UE 210. In some further embodiments, the index of the starting frame of this occasion period may also be informed by the BS 200. As mentioned above, the number of subframes included in each occasion period is signaled from the BS 200 and the UE may hence continuously index the subsequent occasion periods. In this case, signaling of the index of each occasion period may be avoided.

As mentioned above, each EPDCCH occasion period includes K subframes. The determination of EPDCCH search space and thus of the index of this period may be performed from the first subframe of the occasion period. In some other embodiments, the determination of the period index may be performed from any subframe in the occasion period.

At step 420, a distribution of EPDCCH candidates corresponding to the EPDCCH aggregation levels in the EPDCCH occasion period is determined based on the index of the EPDCCH occasion period and the number of search units included in the EPDCCH occasion period.

In order to select an EPDCCH candidate for transmitting DCI to a respective UE, the BS 200 attempts to know the distribution of all the possible EPDCCH candidates in the current occasion period. Since an EPDCCH aggregation level is defined by using a search unit as the minimum unit, the number of search units in the current occasion period may also be associated with the distribution of EPDCCH candidates.

In some embodiments, the determination of the search space for an EPDCCH aggregation level L may be based on the hashing function as defined in the existing 3GPP specifications, but some new parameters, the index of the current EPDCCH occasion period and the number of search units included in the EPDCCH occasion period are used in the hashing function. As such, a location of an EPDCCH candidate m for an EPDCCH aggregation level L may be defined by:

$$L\left\{\left(Y_k + \left\lfloor \frac{m \cdot N_{unit,k}}{L \cdot M^{(L)}} \right\rfloor\right) \bmod \lfloor N_{unit,k}/L \rfloor\right\} + i \quad (2)$$

where

L represents an index of an EPDCCH aggregation level and indicates the number of search units included in each EPDCCH candidate corresponding to the EPDCCH aggregation level L;

i=0, . . . , L−1;

m represents an index of an EPDCCH candidate in the EPDCCH aggregation level L, m=0, 1, . . . , $M^{(L)}$−1, and $M^{(L)}$ represents the number of EPDCCH candidates in the EPDCCH aggregation level L;

k=mod (n, 10), and n represents the index of the current EPDCCH occasion period, such that k is in the range of 0 to 9, which makes the hashing function be more consistent with the existing 3GPP specifications;

$N_{unit,k}$ represents the number of search units included in the current EPDCCH occasion period; and $Y_k$ represents a random number used for the randomization of the search space.

In some embodiments, the random number $Y_k$ may be determined as:

$$Y_k = (A \cdot Y_{k-1}) \bmod D \quad (3)$$

where A represents a random seed and may have a random value such as 39827 or 39829, and D also represents a random value, such as 65537. In one example, $Y_{-1}=n_{RNTI}\neq 0$, where $n_{RNTI}$ represents the C-RNTI of the UE.

According to Equation (2), locations of search units for an EPDCCH candidate corresponding to an EPDCCH aggregation level may be determined in the current EPDCCH occasion period. By way of example, for EPDCCH candidate 1 of AL2, by putting i=0 and i=1 into Equation (2) respectively, it can be determined that Unit #u and Unit #u+1 in the EPDCCH occasion period n are the search units for this EPDCCH candidate.

It is noted that locations search units determined for an EPDCCH candidate based on the hashing function in Equation (2) may be consecutive in the EPDCCH occasion period in a round robin way.

The method 400 proceeds to step 430, where an EPDCCH candidate is selected from the distribution of the EPDCCH candidates for transmitting DCI to UE.

In the distribution, locations of all EPDCCH candidates that are possible to be used for DCI transmission are determined. The BS 200 may select one candidate for a respective UE. When selecting the EPDCCH candidate, the BS 200 may try to avoid DCI transmission collisions in the EPDCCH occasion period.

In some embodiments, the distribution of EPDCCH candidates may be UE-specific. As a result, the BS may determine a respective distribution for each of served in-coverage UEs who need DCI, and select from the respective distribution an EPDCCH candidate for the UE.

In some other embodiments, the distribution of EPDCCH candidates may not be specific for UE, for example, the C-RNTI of the UE may not be considered in Equation (2). In this case, EPDCCH candidates for all served in-coverage UEs may be selected from one determined distribution.

It is to be understood that the method 400 may be perform by the BS 200 to determine the distribution of EPDCCH candidates and select respective EPDCCH candidates for transmitting DCI to served UEs who need resource allocation and other control information, for example, the UEs 210, 220, and 230.

Figure 5:
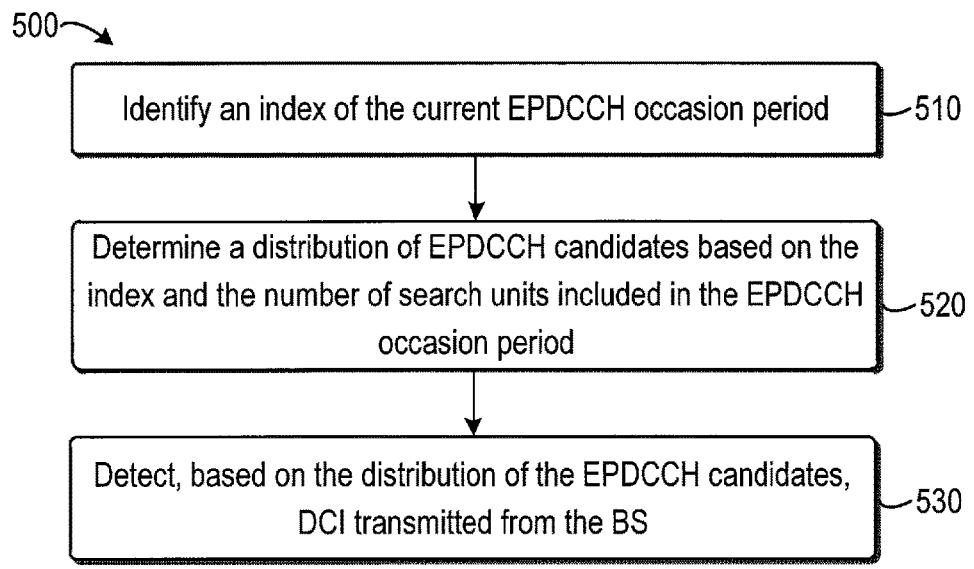
FIG. 5 illustrates a flowchart of a method in user equipment for determining an EPDCCH search space for DCI detection in accordance with one embodiment of the present invention.

FIG. 5 shows the flowchart of a method 500 for determining an EPDCCH search space for DCI detection in accordance with one embodiment of the present invention. The method 500 may be at least in part implemented by UE (for example, the UE 210, 220, or 230), for example.

The method 500 is entered at step 510, where an index of the current EPDCCH occasion period is identified. Then the method proceeds to step 520, where a distribution of EPDCCH candidates corresponding to the EPDCCH aggregation levels in the EPDCCH occasion period is determined based on the index of the EPDCCH occasion period and the number of search units included in the EPDCCH occasion period.

In embodiments of the present invention, UE determines the EPDCCH search space independently. As such, steps 510 and 520 are similar to steps 410 and 420 in the method 400 implemented by the BS, the detailed description of which steps is omitted here for sake of clarity.

At the beginning of each EPDCCH occasion period, the UE may start to detect the DCI transmitted from the BS. Since the UE does not know in advance in which EPDCCH candidate the BS transmits the DCI intended for it, it may first determine the distribution of all the possible EPDCCH candidates in the occasion period before detection.

In some embodiments, the UE may receive from the base station signaling indicative of the number of subframes included in each EPDCCH occasion period. In some embodiment, the UE may also receive signaling an index of the EPDCCH occasion period during which the UE has initial access to the base station. As such, UE may obtain the parameters needed for determining the distribution of EPDCCH candidates, including the index of the current EPDCCH occasion period n, the number of search units included in the EPDCCH occasion period $N_{unit,k}$, and the number of EPDCCH candidates $M^{(L)}$ for the aggregation level L.

In some embodiments, by using Equation (2), the UE may determine the starting search unit of each of the EPDCCH candidates corresponding to each of the defined EPDCCH aggregation level and know clearly the distribution of those EPDCCH candidates in the current occasion period.

The method 500 then proceeds to step 530, where the UE detects DCI transmitted from the base station based on the distribution of the EPDCCH candidates. Specifically, the UE determines a specific location of each of the EPDCCH candidates and then perform blind decoding of DCI in the EPDCCH candidate to detect whether the DCI is carried therein. In some example, the UE may determine the distribution of EPDCCH candidates as shown in FIG. 3. Then the UE may first try to decode the DCI from EPDCCH candidate 1 for AU in Unit 0. If no DCI is detected, the UE may proceed to decode the next EPDCCH candidate until the DCI is detected or all EPDCCH candidates are already decoded. In some embodiments, the UE may decode the DCI from AL1 to AL8 sequentially. In some other embodiments, the UE may randomly select from all the EPDCCH candidates an EPDCCH candidate to perform decoding of DCI. The scope of the present invention is not limited in this regard.

It is to be understood that the method 500 may be perform by any UE (for example, the UE 210, 220, or 230) that is allocated in a coverage area served by the BS 200.

In the above description, the DCI transmission and detection based on the proposed EPDCCH search space configuration are described. In some embodiments, DCI transmitted in one EPDCCH candidate may be mapped to the whole frequency region in each repeated subframe included in the EPDCCH candidate. For example, for MTC UE with 1.4 MHz frequency bandwidth (containing 6 PRB pairs), a DCI may be mapped to the whole 6 PRB pairs in each repeated subframe of the selected EPDCCH candidate.

Since the UE perform blind decoding of DCI for all the possible EPDCCH candidates every EPDCCH occasion period (i.e., every multiple subframes), the average power consumption of the UE can be reduced, which is particularly beneficial to MTC UE that targets a long battery life.

In some user cases where UE suffers poor channel quality, such as MTC UE located in deep inside buildings, the DCI transmitted to the UE may be repeated in the EPDCCH candidate so as to improve the detection performance. In order to achieve the repetition of the DCI, in some embodiments, each EPDCCH aggregation level may be mapped to a respective DCI repetition level having a corresponding number of DCI repetitions, and each EPDCCH candidate corresponding to the EPDCCH aggregation level is associated with the corresponding number of DCI repetitions. That is, the aggregation level is defined per repetition level. The number of DCI transmissions in each of the EPDCCH candidates corresponding to a certain aggregation level is the same. If an EPDCCH candidate is selected, the DCI may be repeated to the UE in the EPDCCH candidate for the corresponding number of times.

In some embodiments, the DCI may be repeated by subframes. In other words, for each specific EPDCCH frequency region, each of the subframes included in the EPDCCH candidate may carry one DCI transmission. In these embodiments, the DCI may be mapped to the whole frequency region in each repeated subframe. A UE who is allocated to the specific EPDCCH frequency region may detect the DCI in such region.

In some cases related to frequency hopping, DCI intended for a specific UE may be repeated in two or more frequency regions. The UE may be informed previously the manner of frequency hopping and the frequency regions allocated to it. In these cases, the UE may detect the DCI repetitions in different frequency regions. For example, DCI indented for a MTC UE may be repeated for 10 times, 5 times of repetition in a first region of 1.4 MHz and 5 times of repetition in a second region of 1.4 MHz. Then the MTC UE may detect the DCI in both the first and second regions. As mentioned above, the EPDCCH search space configuration is specific for an EPDCCH frequency region. Before detecting the DCI in each frequency region, the UE may determine the distribution of EPDCCH candidates for this region based on a respective EPDCCH search space configuration. Then EPDCCH candidates in different distributions may be detected respectively.

By way of example, based on the distribution of EPDCCH candidates shown in FIG. 3, the aggregation level AL1 may be associated with a repetition level RL1, which defines that DCI should be repeated for 10 times in each EPDCCH candidate for AL1. The aggregation level AL2 may be associated With a repetition level RL2, which defines that DCI should be repeated for 20 times in each EPDCCH candidate for AL2. The aggregation level AL4 may be associated with a repetition level RL4, which defines that DCI should be repeated for 40 times in each EPDCCH candidate for AL4. The aggregation level AL8 may be associated with a repetition level RL8, which defines that DCI should be repeated for 80 times in each EPDCCH candidate for AL8. Suppose that the BS select EPDCCH candidate 1 of AL2 for transmitting DCI to the UE. The DCI may be repeated in the EPDCCH candidate 1 for 20 times.

At the UE side, each time the UE decides to detect the DCI in one of the EPDCCH candidates, the UE is able to know the corresponding aggregation level of the EPDCCH candidate and thus know the repetition level associated with the aggregation level. Since the DCI may be repeated in the EPDCCH candidate for a corresponding number of times, the UE may detect the DCI in the EPDCCH candidate for the same times so as to obtain the diversity gain and improve the decoding performance.

In embodiments where aggregation levels are designed for respective repetition levels, the number of subframes included in each search unit B may be determined to fulfill the configuration of DCI repetitions. For example, if the EPDCCH candidate of the minimum size, such as an EPDCCH candidate having a search unit is configured to be associated with a repetition level corresponding to a predetermined number of repetitions, the number of subframes included in one search unit (more specifically, the number of subframes that are available for DCI transmission in the search unit) may be chosen to meet the lowest repetition requirement. For example, if the predetermined number of repetition is 10, the number B may be larger than or equal to 10, ensuring that there are at least 10 subframes available for DCI transmission in each search unit.

Figure 6:
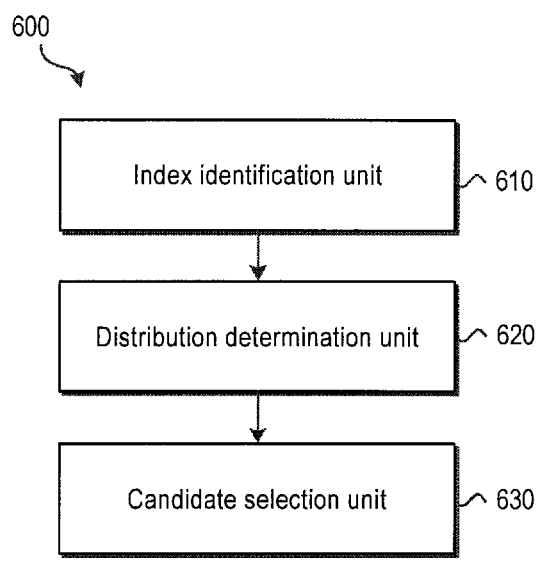
FIG. 6 illustrates a block diagram of a base station in accordance with one embodiment of the present invention.

FIG. 6 shows a block diagram of a base station 600 for determining an EPDCCH search space for DCI transmission in accordance with one embodiment of the present invention.

As shown, the BS 600 comprises an index identification unit 610 configured to identify an index of the current EPDCCH occasion period, each EPDCCH occasion period including a number of subframes, and the subframes being divided to a number of search units. The BS 600 also comprises a distribution determination unit 620 configured to determine, based on the index of the EPDCCH occasion period and the number of search units in the EPDCCH occasion period, a distribution of EPDCCH candidates corresponding to at least one EPDCCH aggregation level in the EPDCCH occasion period, each EPDCCH aggregation level corresponding to at least one EPDCCH candidate, and each EPDCCH candidate including at least one search unit. The BS 600 further comprises a candidate selection unit 630 configured to select, from the distribution of the EPDCCH candidates, an EPDCCH candidate for transmitting DCI to user equipment.

In one embodiment, the BS 600 may further comprise a first signaling unit configured to transmit to the UE signaling indicative of the number of subframes included in each EPDCCH occasion period and an index of the EPDCCH occasion period during which the UE has initial access to the base station.

In one embodiment, the signaling may be one of a broadcasting signal carried in a master information block (MIB), a broadcasting signal carried in a system information block (SIB), or a random access response (RAR) message during the initial access.

In one embodiment, each EPDCCH aggregation level may be associated with a respective DCI repetition level having a corresponding number of DCI repetitions, and each EPDCCH candidate corresponding to the EPDCCH aggregation level may be associated with the corresponding number of DCI repetitions.

In one embodiment, BS 600 may further comprise a repetition unit configured to repeat the DCI in the selected EPDCCH candidate to the user equipment for the corresponding number of times.

In one embodiment, the distribution determination unit 620 may be configured to determine the at least one search unit included in each of the EPDCCH candidates by:

$$L\left\{\left(Y_k + \left\lfloor \frac{m \cdot N_{unit,k}}{L \cdot M^{(L)}} \right\rfloor\right) \bmod \lfloor N_{unit,k}/L \rfloor\right\} + i$$

where

L represents an index of an EPDCCH aggregation level and indicates the number of search units included in each EPDCCH candidate corresponding to the EPDCCH aggregation level;

i=0, . . . , L−1;

m represents an index of an EPDCCH candidate in the EPDCCH aggregation level, m=0, 1, . . . , $M^{(L)}$−1, and $M^{(L)}$ represents the number of EPDCCH candidates in the EPDCCH aggregation level;

k=mod (n, 10), and n represents the index of the EPDCCH occasion period;

$N_{unit,k}$ represents the number of search units included in the EPDCCH occasion period; and $Y_k$ represents a random value for the EPDCCH occasion period.

In one embodiment, the user equipment may include user equipment for machine type communication.

Figure 7:
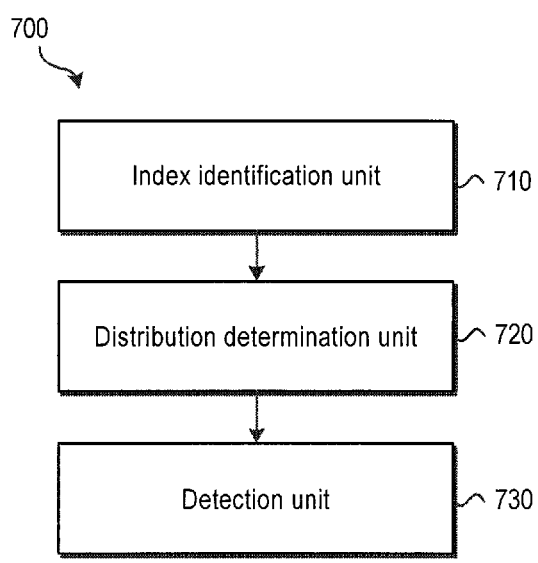
FIG. 7 illustrates a block diagram of user equipment in accordance with one embodiment of the present invention.

FIG. 7 shows a block diagram of user equipment 700 for determining an EPDCCH search space for DCI detection in accordance with embodiments of the present invention.

As shown, the UE 700 comprises an index identification unit 710 configured to identify an index of the current EPDCCH occasion period, each EPDCCH occasion period including a number of subframes, and the subframes being divided to a number of search units. The UE 700 also comprises a distribution determination unit 720 configured to determine, based on the index of the EPDCCH occasion period and the number of search units in the EPDCCH occasion period, a distribution of EPDCCH candidates corresponding to at least one EPDCCH aggregation level in the EPDCCH occasion period, each EPDCCH aggregation level corresponding to at least one EPDCCH candidate, and each EPDCCH candidate including at least one search unit. The UE 700 further comprises a detection unit 730 configured to detect, based on the distribution of the EPDCCH candidates, DCI transmitted from a base station.

In one embodiment, the UE 700 may further comprise a first signaling receiving unit configured to receive from the base station signaling indicative of the number of subframes included in each EPDCCH occasion period and an index of the EPDCCH occasion period during which the UE has initial access to the base station.

In one embodiment, the signaling may be one of a broadcasting signal carried in a master information block (MIB), a broadcasting signal carried in a system information block (SIB), or a random access response (RAR) message during the initial access.

In one embodiment, the determining of the distribution of the EPDCCH candidates may be further based on indexes of the EPDCCH candidates and indexes of the EPDCCH aggregation levels corresponding to the EPDCCH candidates.

In one embodiment, each EPDCCH aggregation level may be associated with a respective DCI repetition level having a corresponding number of DCI repetitions, and each EPDCCH candidate corresponding to the EPDCCH aggregation level may be associated with the corresponding number of DCI repetitions.

In one embodiment, the detection unit 730 may be further configured to detect the DCI in each of the EPDCCH candidates for the corresponding number of times.

In one embodiment, the distribution determination unit 720 may be configured to determine the at least one search unit included in each of the EPDCCH candidates by:

$$L\left\{\left(Y_k + \left\lfloor \frac{m \cdot N_{unit,k}}{L \cdot M^{(L)}} \right\rfloor\right) \bmod \lfloor N_{unit,k}/L \rfloor\right\} + i$$

where

L represents an index of an EPDCCH aggregation level and indicates the number of search units included in each EPDCCH candidate corresponding to the EPDCCH aggregation level;

i=0, . . . , L−1;

m represents an index of an EPDCCH candidate in the EPDCCH aggregation level, m=0, 1, . . . , $M^{(L)}$−1, and $M^{(L)}$ represents the number of EPDCCH candidates in the EPDCCH aggregation level;

k=mod (n, 10), and n represents the index of the EPDCCH occasion period;

$N_{unit,k}$ represents the number of search units included in the EPDCCH occasion period; and $Y_k$ represents a random value for the EPDCCH occasion period.

In one embodiment, the user equipment may include user equipment for machine type communication.

The units included in the apparatuses 600 and/or 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and/or 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some embodiments of the present invention, in order to reduce the number of blind decoding efforts and achieve reduced power consumption, it is also proposed another EPDCCH search space configuration where different sets of EPDCCH aggregation level are monitored by different time periods. Specifically, different sets of EPDCCH aggregation level may be defined, each of which includes one or more EPDCCH aggregation levels. A set including one or more higher EPDCCH aggregation levels may be configured with a longer monitor periodicity, and a set including lower EPDCCH aggregation levels may be configured with a shorter monitor periodicity.

In an embodiment, the definition of the aggregation levels may be specified in the existing 3GPP specifications, such as the aggregation levels based on ECCEs. In another embodiment, the aggregation levels grouped in the sets may be those described in the above embodiments, such as the aggregation levels illustrated in FIG. 3. Each of the aggregation levels may use a search unit including one or more subframes as the minimum unit.

In some embodiments of the present invention, two sets of EPDCCH aggregation levels are defined for DCI transmission between a BS and UE, namely Aggregation level set 1 with a first monitor periodicity T1 and Aggregation level set 2 with a second monitor periodicity T2. In an embodiment, the first monitor periodicity T1 may be larger the second monitor T2. For example, T1 may be equal to time duration of T EPDCCH occasion periods, where T is larger than or equal to 2. T2 may be equal to time duration of at least one EPDCCH occasion period. In one example, T2 may be equal to time duration of only one EPDCCH occasion period.

In some embodiments, at least one of the EPDCCH aggregation levels included in Aggregation level set 1 is higher than the number of EPDCCH aggregation levels included in Aggregation level set 2. For example, Aggregation level set 2 may include aggregation level AL4, while a higher aggregation level, AL 8, may be included in Aggregation level set 1. As mentioned above, the higher the aggregation level is, the more the search units included in each of the EPDCCH candidates for the aggregation level is. With more search units included in the EPDCCH candidates, DCI may be repeated for a larger number of times and the probability of successful detection at the UE side may be increased. In one embodiment, the number of aggregation levels included in the first set may be larger than that in the second set. For example, Aggregation level set 1 may include all the defined aggregation levels, e.g., AL1 to AL8 defined in the EPDCCH search space shown in FIG. 3, while Aggregation level set 2 may include one aggregation level, e.g., AL 1. AL2, AL4, and AL8 included in the first set are higher than AL1 included in the second set. It is appreciated that the number of aggregation levels in the sets may not be limited as long as at least one aggregation level in Aggregation level set 1 is higher than that in Aggregation level set 2.

In these embodiments, the UE only needs to monitor more and higher aggregation levels in the set 1 for a relatively long time period. Most of the time the UE monitor aggregation levels corresponding to EPDCCH candidates with less search units in the set 2. As such, the number of blind decoding efforts can be reduced. The above described EPDCCH search space configuration generally targets for UEs with low mobility, the channel responses of which do not change frequently. By having a periodic configured Aggregation level set 1 with more and higher aggregation levels, even when the channel condition suddenly become deteriorated, DCI can still be successfully decoded in the longer monitor periodicity for Aggregation level set 1.

In some embodiments where the first and second periodicities are overlapped in the same occasion period, the aggregation levels in one of the first and second sets may be detected. For example, the first set may be detected only since it contains more and higher aggregation levels. In some other embodiments, all aggregation levels in the union set of the first and second sets may be detected. The scope of the present invention is not limited in this regard.

In some embodiments, the aggregation levels included in the sets may be configured by the BS and may be signaled to the UE via UE-specific high layer signaling, such as radio resource control (RRC) signaling. Other signaling may also be used to inform the aggregation levels, such as a broadcasting signal carried in a MIB/SIB, or a RAR message during the initial access of the UE. The first and second monitor periodicities corresponding to the sets may also be informed to the UE in the same signaling. In some embodiments where the second monitor periodicity is configured to be one EPDCCH occasion period, the second periodicity may not be signaled to the UE, and the UE may decode the aggregation levels in the second set in each EPDCCH occasion period by default.

Figure 8:
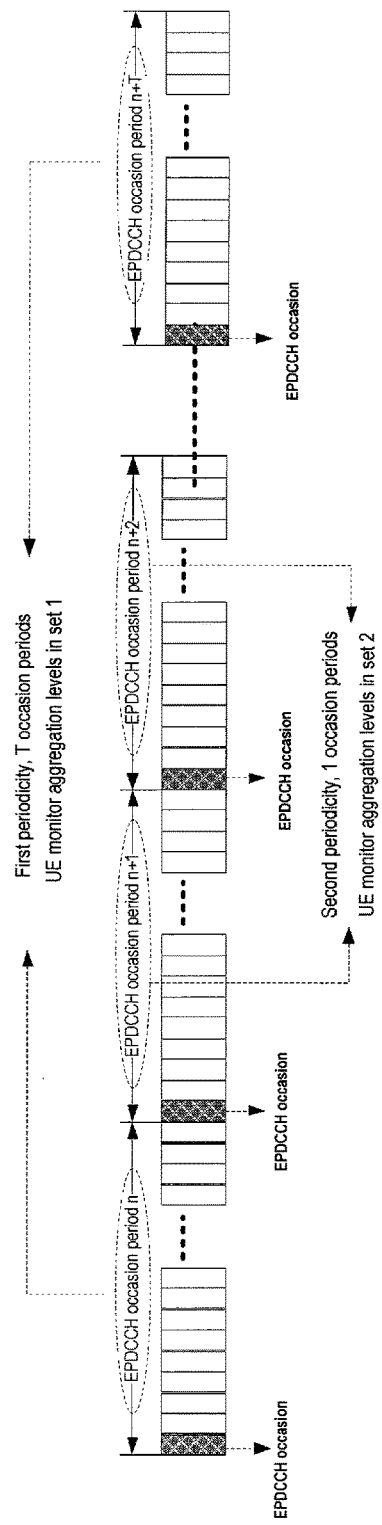
FIG. 8 illustrates a schematic diagram of EPDCCH search space configuration in accordance with another embodiment of the present invention.

FIG. 8 illustrates a schematic diagram of EPDCCH search space configuration in accordance with another embodiment of the present invention. The EPDCCH search space configuration is based on the definition of EPDCCH aggregation level of FIG. 3. It is noted that other definitions of EPDCCH aggregation level may also be suitable for aggregation level grouping.

In FIG. 8, Aggregation level set 1 includes all the defined aggregation levels, e.g., AL1 to ALB. The UE may only need to monitor the aggregation levels in set 1 every T EPDCCH occasion periods, where T is larger than or equal to two. Aggregation level set 2 includes one aggregation level, e.g., AL1. The UE may monitor AL1 in each EPDCCH occasion period. That is, the second periodicity corresponding to Aggregation level set 2 is one EPDCCH occasion period. In some conditions the first periodicity and the second periodicity are overlapped in the same occasion period. For example, in FIG. 8, the second periodicity may be overlapped with the first periodicity in the EPDCCH occasion period n+T. In this case, the BS may select EPDCCH candidates corresponding to the aggregation levels in Aggregation level set 1 for DCI transmission, while the UE may monitor Aggregation level set 1 only in the EPDCCH occasion period n+T.

It is noted that more than two sets of aggregation level may be defined, each of which comprises different aggregation level and has different monitor periodicities. It is also noted that the monitor periodicities for the sets may be set as other values. For example, the second monitor periodicity for Aggregation level set 2 may include two EPDCCH occasion periods. The scope of the present invention is not limited in these regards.

The sets of aggregation level and the monitor periodicities may be configured by the base station and then informed to the UE. In some embodiments, the base station may select an EPDCCH candidate from EPDCCH candidates corresponding to aggregation levels in respective sets according to their monitor periodicities. For example, with respect to the EPDCCH search space configuration shown in FIG. 8, in the EPDCCH occasion period n, the base station may select any of the EPDCCH candidates corresponding to all the defined aggregation levels for DCI transmission. In the EPDCCH occasion period n+1, the base station may select from the four EPDCCH candidates corresponding to AL1 an EPDCCH candidate for DCI transmission.

The principle of the EPDCCH search space configuration is described with reference to FIG. 8. DCI transmission in a base station and DCI detection in user equipment based on this EPDCCH search space configuration will be set forth below.

Figure 9:
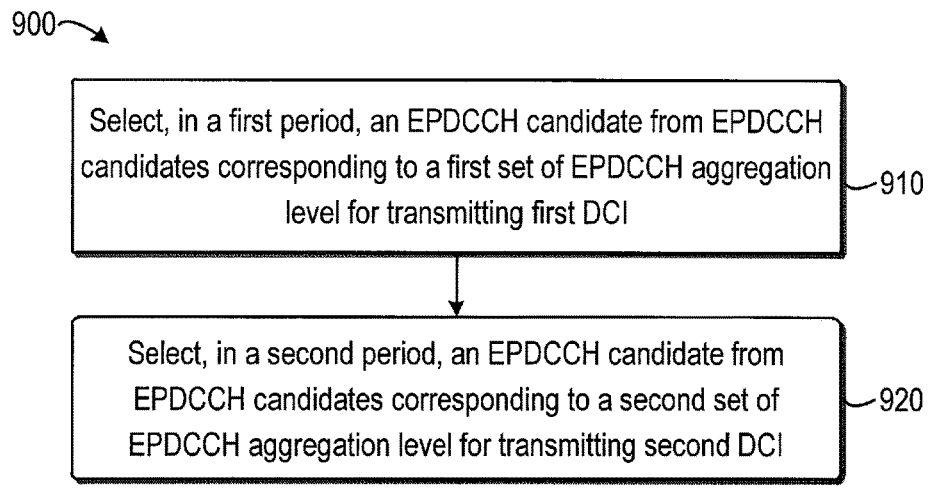
FIG. 9 illustrates a flowchart of a method in a base station for determining an EPDCCH search space for DCI transmission in accordance with another embodiment of the present invention.

FIG. 9 shows a flowchart of a method 900 for determining an EPDCCH search space for DCI transmission in accordance with another embodiment of the present invention. The method 900 may be at least in part implemented by the BS 200, for example.

The method 900 is entered at step 910, where an EPDCCH candidate is selected in a first periodicity from EPDCCH candidates corresponding to a first set of EPDCCH aggregation level for transmitting first DCI to user equipment. The first set of EPDCCH aggregation level is also referred to as Aggregation level set 1 as described above and may include at least two EPDCCH aggregation levels. Each EPDCCH aggregation level is corresponding to at least one EPDCCH candidate.

As discussed above, the aggregation levels may be those specified in the existing 3GPP specifications, such as those using an ECCE as the minimum unit in one embodiment. In this embodiment, each EPDCCH candidate may include at least one ECCE for DCI transmission, and the first periodicity may be time duration of multiple subframes. In another embodiment, the aggregation levels may be based on the search units including one or more subframes. In this embodiment, each EPDCCH candidate may include at least one subframe for DCI transmission, and the first periodicity may be time duration of multiple EPDCCH occasion periods.

Regardless of the definition of the EPDCCH levels, in the first periodicity, the BS may only select the EPDCCH candidate for transmitting the first DCI from EPDCCH candidates corresponding to the aggregation levels included in the first set.

In embodiments where the EPDCCH aggregation level are based on search units, when selecting the EPDCCH candidate, the BS may first determine the distribution of the available EPDCCH candidates in an EPDCCH occasion period in the first periodicity (for example, the first EPDCCH occasion period in the first periodicity). The determination of the distribution of EPDCCH candidates may be similar to what is described above. After the distribution is determined, the BS may select from the determined distribution an EPDCCH candidate for transmitting the first DCI.

At step 920, an EPDCCH candidate is selected in a second periodicity from EPDCCH candidates corresponding to a second set of EPDCCH aggregation level for transmitting second DCI to the user equipment. The second set of EPDCCH aggregation level is also referred to as Aggregation level set 2 as described above and may include at least one EPDCCH aggregation levels. Each EPDCCH aggregation level is corresponding to at least one EPDCCH candidate.

In embodiments where the EPDCCH aggregation level are based on search units, when selecting the EPDCCH candidate, the BS may first determine the distribution of the available EPDCCH candidates in an EPDCCH occasion period in the second periodicity (for example, the first EPDCCH occasion period in the second periodicity). The determination of the distribution of EPDCCH candidates may be similar to what is described above. After the distribution is determined, the BS may select from the determined distribution an EPDCCH candidate for transmitting the second DCI.

In embodiments of the present invention, the first periodicity is longer than the second periodicity, and at least one of the EPDCCH aggregation levels included in the first set is higher than the EPDCCH aggregation levels included in the second set. As such, the UE may only need to monitor higher aggregation levels in the first set for a relatively long time period. Most of the time the UE detect lower aggregation levels in the second set. In this case, the number of blind decoding efforts for the UE can be decreased and thus the power consumption of the UE can be reduced.

In some embodiments, the EPDCCH aggregation levels included in the first and second sets and the first periodicity and/or the second periodicity may be signaled to the UE via high layer signaling such as RRC signaling, a broadcasting signal carried in a MIB/SIB, or a RAR message during the initial access of the UE.

It is to be understood that the method 900 may be perform by the BS 900 to determine the distribution of EPDCCH candidates and select respective EPDCCH candidates for transmitting DCI to served UEs who need resource allocation and other control information, for example, the UEs 210, 220, and 230.

Figure 10:
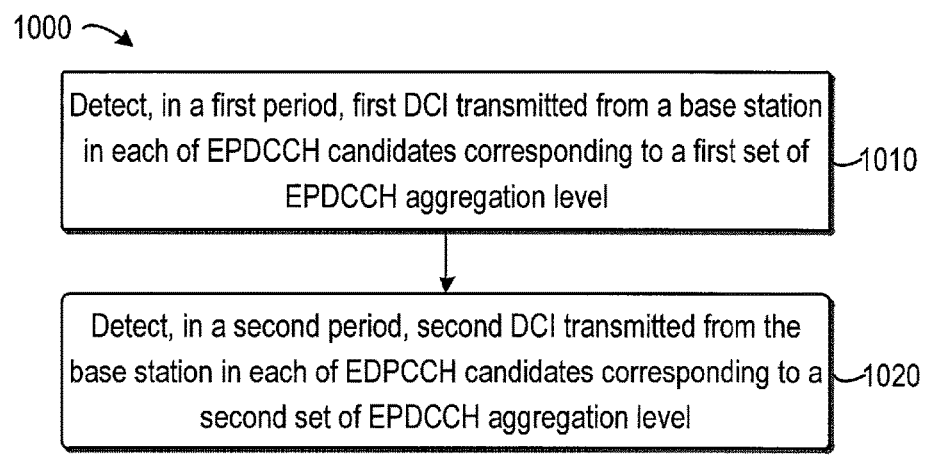
FIG. 10 illustrates a flowchart of a method in user equipment for determining an EPDCCH search space for DCI detection in accordance with another embodiment of the present invention.

FIG. 10 shows a flowchart of a method 1000 for determining an EPDCCH search space for DCI detection in accordance with another embodiment of the present invention. The method 1000 may be at least in part implemented by the UE 210, 220, or 230, for example.

The method 1000 is entered at step 1010, where the UE detects, in a first periodicity, first DCI transmitted from a base station in each of EPDCCH candidates corresponding to a first set of EPDCCH aggregation level.

The first set of EPDCCH aggregation level is also referred to as Aggregation level set 1 as described above and may include at least two EPDCCH aggregation levels. Each EPDCCH aggregation level is corresponding to at least one EPDCCH candidate. In the first periodicity, the UE may detect each of EPDCCH candidates corresponding to the aggregation levels included in the first set.

In embodiments where the EPDCCH aggregation level are based on search units, when selecting the EPDCCH candidate, the UE may first determine the distribution of the available EPDCCH candidates in an EPDCCH occasion period in the first periodicity (for example, the first EPDCCH occasion period in the first periodicity). The determination of the distribution of EPDCCH candidates may be similar to what is described above. After the distribution is determined, the UE may detect each of the EPDCCH candidates based on the determined distribution.

At step 1020, the UE detects, in a second periodicity, second DCI transmitted from the base station in each of EPDCCH candidates corresponding to a second set of EPDCCH aggregation level.

The second set of EPDCCH aggregation level is also referred to as Aggregation level set 2 as described above and may include at least one EPDCCH aggregation levels. Each EPDCCH aggregation level is corresponding to at least one EPDCCH candidate.

In embodiments where the EPDCCH aggregation level are based on search units, when selecting the EPDCCH candidate, the UE may first determine the distribution of the available EPDCCH candidates in an EPDCCH occasion period in the second periodicity (for example, the first EPDCCH occasion period in the second periodicity). The determination of the distribution of EPDCCH candidates may be similar to what is described above. After the distribution is determined, the UE may detect each of the EPDCCH candidates based on the determined distribution.

In embodiments of the present invention, the first periodicity is longer than the second periodicity, and at least one of the EPDCCH aggregation levels included in the first set is higher than the EPDCCH aggregation levels included in the second set. As such, the UE may only need to monitor higher aggregation levels in the first set for a relatively long time period. Most of the time the UE detect lower aggregation levels in the second set. In this case, the number of blind decoding efforts for the UE can be decreased and thus the power consumption of the UE can be reduced.

In some embodiments, the UE may receive from the BS signaling indicative of the EPDCCH aggregation levels included in the first and second sets and the first periodicity and/or the second periodicity. The signaling may be high layer signaling such as RRC signaling, a broadcasting signal carried in a MIB/SIB, or a RAR message during the initial access of the UE.

It is to be understood that the method 1000 may be perform by any UE (for example, the UE 210, 220, or 230) that is allocated in a coverage area served by the BS 200.

Figure 11:
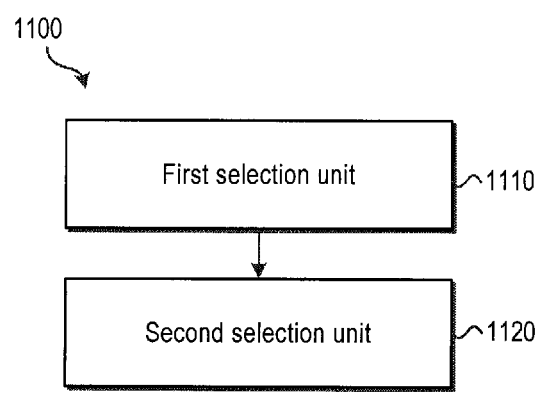
FIG. 11 illustrates a block diagram of a base station in accordance with another embodiment of the present invention.

FIG. 11 shows a block diagram of a base station 1100 for determining an EPDCCH search space for DCI transmission in accordance with another embodiment of the present invention.

As shown, the BS 1100 comprises a first selection unit 1110 configured to select, in a first periodicity, an EPDCCH candidate from EPDCCH candidates corresponding to a first set of EPDCCH aggregation level for transmitting first DCI to user equipment, the first set including at least one EPDCCH aggregation level and each EPDCCH aggregation level corresponding to at least one EPDCCH candidate. The BS 1100 also comprises a second selection unit 1120 configured to select, in a second periodicity, an EPDCCH candidate from EPDCCH candidates corresponding to a second set of EPDCCH aggregation level for transmitting the second DCI to the user equipment, the second set including at least one EPDCCH aggregation level and each EPDCCH aggregation level corresponding to at least one EPDCCH candidate. The first periodicity is longer than the second periodicity, and at least one of the EPDCCH aggregation level included in the first set is higher than the EPDCCH aggregation level included in the second set.

In one embodiment, the BS 1100 may further comprise a first signaling unit configured to transmit to the UE signaling indicative of the EPDCCH aggregation levels included in the first and second sets and the first periodicity and/or the second periodicity.

In one embodiment, the signaling may be one of a broadcasting signal carried in a master information block (MIB), a broadcasting signal carried in a system information block (SIB), a random access response (RAR) message during the initial access, or UE-specific high layer signaling.

In one embodiment, the first periodicity may have time duration of at least two EPDCCH occasion periods and the second periodicity having time duration of at least one EPDCCH occasion period, each EPDCCH occasion period being including a number of subframes, and the subframes divided to a number of search units, and each EPDCCH candidate may include at least one search unit.

In one embodiment, the BS 1100 may further comprise a second signaling unit configured to transmit to the UE signaling indicative of the number of subframes included in each EPDCCH occasion period and an index of the EPDCCH occasion period during which the UE has initial access to the base station.

In one embodiment, the signaling may be one of a broadcasting signal carried in a master information block (MIB), a broadcasting signal carried in a system information block (SIB), or a random access response (RAR) message during the initial access.

In one embodiment, the first selection unit 1110 may be further configured to determine, based on an index of the first EPDCCH occasion period in the first periodicity and the number of search units included in the first EPDCCH occasion period, a distribution of EPDCCH candidates corresponding to the at least one EPDCCH aggregation level included in the first set for the first periodicity; and select, from the determined distribution of the EPDCCH candidates, an EPDCCH candidate for transmitting the first DCI to the user equipment.

In one embodiment, the second selection unit 1120 may be further configured to determine, based on an index of the first EPDCCH occasion period in the second periodicity and the number of search units included in the first EPDCCH occasion period, a distribution of EPDCCH candidates corresponding to the at least one EPDCCH aggregation level included in the second set for the second periodicity; and select, from the determined distribution of the EPDCCH candidates, an EPDCCH candidate for transmitting the second DCI to the user equipment.

In one embodiment, the distribution of the EPDCCH candidates is determined by determine the at least one search unit included in each of the EPDCCH candidates by:

$$L\left\{\left(Y_k + \left\lfloor \frac{m \cdot N_{unit,k}}{L \cdot M^{(L)}} \right\rfloor\right) \bmod \lfloor N_{unit,k} / L \rfloor\right\} + i$$

where

L represents an index of an EPDCCH aggregation level and indicates the number of search units included in each EPDCCH candidate corresponding to the EPDCCH aggregation level;

i=0, . . . , L−1;

m represents an index of an EPDCCH candidate in the EPDCCH aggregation level, m=0, 1, . . . , $M^{(L)}$−1, and $M^{(L)}$ represents the number of EPDCCH candidates in the EPDCCH aggregation level;

k=mod (n, 10), and n represents the index of the EPDCCH occasion period;

$N_{unit,k}$ represents the number of search units included in the EPDCCH occasion period; and $Y_k$ represents a random value for the EPDCCH occasion period.

In one embodiment, each EPDCCH aggregation level may be associated with a respective DCI repetition level having a corresponding number of DCI repetitions, and each EPDCCH candidate corresponding to the EPDCCH aggregation level may be associated with the corresponding number of DCI repetitions.

In one embodiment, BS 1100 may further comprise a repetition unit configured to repeat the DCI in the selected EPDCCH candidate to the user equipment for the corresponding number of times.

Figure 12:
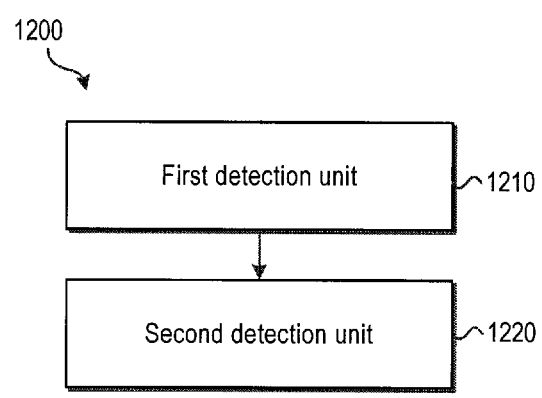
FIG. 12 illustrates a block diagram of user equipment in accordance with another embodiment of the present invention.

FIG. 12 shows a block diagram of user equipment 1200 for determining an EPDCCH search space for DCI detection in accordance with another embodiment of the present invention.

As shown, the UE 1200 comprises a first detection unit 1210 configured to detect, in a first periodicity, first DCI transmitted from a base station in each of EPDCCH candidates corresponding to a first set of EPDCCH aggregation level, the first set including at least two EPDCCH aggregation levels and each EPDCCH aggregation level corresponding to at least one EPDCCH candidate. The UE 1200 also comprises a second detection unit configured to detect, in a second periodicity, second DCI transmitted 1220 from the base station in each of EPDCCH candidates corresponding to a second set of EPDCCH aggregation level, the second set including at least one EPDCCH aggregation level and each EPDCCH aggregation level corresponding to at least one EPDCCH candidate. The first periodicity is longer than the second periodicity, and at least one of the EPDCCH aggregation level included in the first set is higher than the EPDCCH aggregation level included in the second set.

In one embodiment, the UE 1200 may further comprise a first signaling receiving unit configured to receive from the base station signaling indicative of the EPDCCH aggregation levels included in the first and second sets and the first periodicity and/or the second periodicity.

In one embodiment, the signaling may be one of a broadcasting signal carried in a master information block (MIB), a broadcasting signal carried in a system information block (SIB), a random access response (RAR) message during the initial access, or UE-specific high layer signaling.

In one embodiment, the first periodicity may have time duration of at least two EPDCCH occasion periods and the second periodicity having time duration of at least one EPDCCH occasion period, each EPDCCH occasion period being divided to a number of search units and each search unit including at least one subframe. Each EPDCCH candidate includes at least one search unit.

In one embodiment, the UE 1200 may further comprise a second signaling receiving unit configured to receive from the base station signaling indicative of the number of subframes included in each EPDCCH occasion period and an index of the EPDCCH occasion period during which the UE has initial access to the base station.

In one embodiment, the signaling may be one of a broadcasting signal carried in a master information block (MIB), a broadcasting signal carried in a system information block (SIB), or a random access response (RAR) message during the initial access.

In one embodiment, the first detection unit 1210 may be configured to determine, based on an index of the first EPDCCH occasion period in the first periodicity and the number of search units included in the first EPDCCH occasion period, a distribution of EPDCCH candidates corresponding to EPDCCH aggregation levels included in the first set for the first periodicity; and detect, based on the determined distribution of the EPDCCH candidates, the first DCI transmitted from the base station.

In one embodiment, the second detection unit 1220 may be configured to determine, based on an index of the first EPDCCH occasion period in the second periodicity and the number of search units included in the first EPDCCH occasion period, a distribution of EPDCCH candidates corresponding to EPDCCH aggregation levels included in the second set for the second periodicity; and detect, based on the determined distribution of the EPDCCH candidates, the second DCI transmitted from the base station.

In one embodiment, the distribution of the EPDCCH candidates is determined by determine the at least one search unit included in each of the EPDCCH candidates by:

$$L\left\{\left(Y_k + \left\lfloor \frac{m \cdot N_{unit,k}}{L \cdot M^{(L)}} \right\rfloor\right) \bmod \lfloor N_{unit,k}/L \rfloor \right\} + i$$

where

L represents an index of an EPDCCH aggregation level and indicates the number of search units included in each EPDCCH candidate corresponding to the EPDCCH aggregation level;

i=0, . . . , L−1;

m represents an index of an EPDCCH candidate in the EPDCCH aggregation level, m=0, 1, . . . , $M^{(L)}$−1, and $M^{(L)}$ represents the number of EPDCCH candidates in the EPDCCH aggregation level;

k=mod (n, 10), and n represents the index of the EPDCCH occasion period;

$N_{unit,k}$ represents the number of search units included in the EPDCCH occasion period; and $Y_k$ represents a random value for the EPDCCH occasion period.

In one embodiment, each EPDCCH aggregation level may be associated with a respective DCI repetition level having a corresponding number of DCI repetitions, and each EPDCCH candidate corresponding to the EPDCCH aggregation level may be associated with the corresponding number of DCI repetitions.

In one embodiment, the first detection unit 1210 may be configured to detect the first DCI in each of the EPDCCH candidates for the corresponding number of times. The second detection unit 1220 may be configured to detect the second DCI in each of the EPDCCH candidates for the corresponding number of times.

The units included in the apparatuses 1100 and/or 1200 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 1100 and/or 1200 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Embodiments of the present invention also provide a computer-readable storage medium having computer program codes stored thereon, the computer program codes being configured to, when executed, cause an apparatus to perform steps in the methods as described hereinabove. Further, there is provided a computer program product comprising a computer-readable storage medium as provided in the present invention.

Embodiments of the present invention also provide an apparatus comprising at least one processor and at least one memory including computer program code. The at least one memory and the computer program code are configured to, with the at least one processor, cause the apparatus to perform steps in the methods as described hereinabove.

The embodiments of the present invention described hereinbefore in association with FIGS. 3 to 12 may be used in any combination with each other. Several of the embodiments may be combined together to form a further embodiment of the present invention.

As used in this application, the term 'circuitry' and 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device The exemplary embodiments of the present invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware may be used to implement the exemplary embodiments, and they may be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (for example, records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a static RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the present invention described hereinbefore in association with the figures presented and the summary of the present invention may be used in any combination with each other. Several of the embodiments may be combined together to form a further embodiment of the present invention.

It is obvious to a person skilled in the art that with the advancement of technology, the basic idea of the present invention may be implemented in various ways. The present invention and its embodiments are thus not limited to the examples described above; instead they may vary within the scope of the claims.

What is claimed is:

1. A method comprising:
    identifying, by a user equipment, an enhanced physical downlink control channel occasion period, the enhanced physical downlink control channel occasion period including a number of subframes equal to two or more subframes;
    determining, based on the enhanced physical downlink control channel occasion period, a distribution of enhanced physical downlink control channel candidates corresponding to at least one enhanced physical downlink control channel repetition level in the two or more subframes of the enhanced physical downlink control channel occasion period, wherein the at least one enhanced physical downlink control channel repetition level is mapped to the distribution of enhanced physical downlink control channel candidates in the two or more subframes;
    detecting, based on the distribution of the enhanced physical downlink control channel candidates, downlink control information transmitted from a base station; and
    receiving, from the base station, signaling indicative of the number of subframes included in each enhanced physical downlink control channel occasion period and a starting subframe of the enhanced physical downlink control channel occasion period during which the user equipment has initial access to the base station.

2. The method according to claim 1, wherein the signaling is one of a broadcasting signal carried in a master information block, a broadcasting signal carried in a system information block, or a random access response message during the initial access.

3. The method according to claim 1, wherein each of the at least one enhanced physical downlink control channel repetition level is associated with a respective downlink control information repetition level having a corresponding number of downlink control information repetitions, and each of the distribution of enhanced physical downlink control channel candidates corresponding to the at least one enhanced physical downlink control channel repetition level is associated with the corresponding number of downlink control information repetitions.

4. The method according to claim 3, wherein detecting the downlink control information comprises: detecting the downlink control information in each of the distribution of enhanced physical downlink control channel candidates for the corresponding number of downlink control information repetitions.

5. The method according to claim 1, wherein the user equipment is a user equipment for machine type communication.

6. An apparatus, comprising:
at least one processor; and
at least one non-transitory memory including computer program code, wherein the at least one memory and the computer program code are configured to, with the at least one processor, cause the apparatus at least to:
identify an enhanced physical downlink control channel occasion period, the enhanced physical downlink control channel occasion period including a number of subframes equal to two or more subframes;
determine, based on the enhanced physical downlink control channel occasion period, a distribution of enhanced physical downlink control channel candidates corresponding to at least one enhanced physical downlink control channel repetition level in the two or more subframes in the enhanced physical downlink control channel occasion period, wherein the at least one enhanced physical downlink control channel repetition level is mapped to the distribution of enhanced physical downlink control channel candidates in the two or more subframes;
select, from the distribution of the enhanced physical downlink control channel candidates, an enhanced physical downlink control channel candidate for transmitting downlink control information to a user equipment; and
transmit to the user equipment signaling indicative of the number of subframes included in each enhanced physical downlink control channel occasion period and a starting subframe of the enhanced physical downlink control channel occasion period during which the user equipment has initial access to the apparatus.

7. The apparatus according to claim 6, wherein the signaling is one of a broadcasting signal carried in a master information block, a broadcasting signal carried in a system information block, or a random access response message during the initial access.

8. The apparatus according to claim 6, wherein each of the at least one enhanced physical downlink control channel repetition level is associated with a respective downlink control information repetition level having a corresponding number of downlink control information repetitions, and each enhanced physical downlink control channel candidate of the distribution of enhanced physical downlink control channel candidates is corresponding to the at least one enhanced physical downlink control channel repetition level is associated with the corresponding number of downlink control information repetitions.

9. The apparatus according to claim 8, wherein the at least one memory and computer program code are further configured to, with the at least one processor, cause the apparatus at least to: repeat the downlink control information in the selected enhanced physical downlink control channel candidate to the user equipment for the corresponding number of downlink control information repetitions.

10. The apparatus, according to claim 6, wherein the downlink control information includes a first downlink control information and a second downlink control information, and wherein the at least one memory and computer program instructions are further configured to, with the at least one processor, cause the apparatus at least to:
select, in a first periodicity, an enhanced physical downlink control channel candidate from enhanced physical downlink control channel candidates corresponding to a first set of enhanced physical downlink control channel repetition level for transmitting the first downlink control information to the user equipment; and
select, in a second periodicity, an enhanced physical downlink control channel candidate from enhanced physical downlink control channel candidates corresponding to a second set of enhanced physical downlink control channel repetition level for transmitting the second downlink control information to the user equipment.

11. The apparatus according to claim 6, wherein the user equipment is a user equipment for machine type communication.

12. An apparatus, comprising:
at least one processor; and
at least one memory including computer program code, wherein the at least one memory and the computer program code are configured to, with the at least one processor, cause the apparatus at least to:
identify an enhanced physical downlink control channel occasion period, the enhanced physical downlink control channel occasion period including a number of subframes equal to two or more subframes;
determine, based on the enhanced physical downlink control channel occasion period, a distribution of enhanced physical downlink control channel candidates corresponding to at least one enhanced physical downlink control channel repetition level in the two or more subframes of the enhanced physical downlink control channel occasion period, wherein the at least one enhanced physical downlink control channel repetition level is mapped to the distribution of enhanced physical downlink control channel candidates in the two or more subframes;
detect, based on the distribution of the enhanced physical downlink control channel candidates, downlink control information transmitted from a base station; and
receive, from the base station, signaling indicative of the number of subframes included in each enhanced physical downlink control channel occasion period and a starting subframe of the enhanced physical downlink control channel occasion period during which the apparatus has initial access to the base station.

13. The apparatus according to claim 12, wherein the signaling is one of a broadcasting signal carried in a master information block, a broadcasting signal carried in a system information block, or a random access response message during the initial access.

14. The apparatus according to claim 12, wherein each of the at least one enhanced physical downlink control channel repetition level is associated with a respective downlink control information repetition level having a corresponding number of downlink control information repetitions, and each of the distribution of enhanced physical downlink control channel candidates corresponding to the at least one enhanced physical downlink control channel repetition level is associated with the corresponding number of downlink control information repetitions.

15. The apparatus according to claim 14, wherein the at least one memory and computer program code are further configured to, with the at least one processor, cause the apparatus at least to: detect the downlink control information in each of the distribution of enhanced physical downlink control channel candidates for the corresponding number of downlink control information repetitions.

16. The apparatus, according to claim 12, wherein the downlink control information includes a first downlink control information and a second downlink control information, and wherein the at least one memory and computer program instructions are further configured to, with the at least one processor, cause the apparatus at least to: detect, in a first periodicity, the first downlink control information in each of the distribution of enhanced physical downlink control channel candidates corresponding to a first set of enhanced physical downlink control channel repetition level; and detect, in a second periodicity, the second downlink control information in each of the distribution of enhanced physical downlink control channel candidates corresponding to a second set of enhanced physical downlink control channel repetition level.

17. The apparatus according to claim 12, wherein the apparatus is a user equipment for machine type communication.

* * * * *